United States Patent
Hsu

(10) Patent No.: US 10,546,431 B2
(45) Date of Patent: Jan. 28, 2020

(54) SYSTEMS AND METHODS TO AUGMENT AN APPEARANCE OF PHYSICAL OBJECT FOR AN AUGMENTED REALITY EXPERIENCE

(71) Applicant: Disney Enterprises, Inc., Burbank, CA (US)

(72) Inventor: Jonathan R. Hsu, Pomona, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1 day.

(21) Appl. No.: 15/940,160

(22) Filed: Mar. 29, 2018

(65) Prior Publication Data

US 2019/0304191 A1 Oct. 3, 2019

(51) Int. Cl.
*G06T 19/00* (2011.01)
*G06F 3/01* (2006.01)

(52) U.S. Cl.
CPC .................. *G06T 19/006* (2013.01)

(58) Field of Classification Search
CPC ................................... G06T 19/006
USPC ....................................... 345/633
See application file for complete search history.

(56) References Cited

U.S. PATENT DOCUMENTS

| 6,162,123 | A | 12/2000 | Woolston | |
|---|---|---|---|---|
| 7,719,563 | B2 * | 5/2010 | Richards | G06F 3/04815 348/36 |
| 9,972,138 | B2 | 5/2018 | Goslin | |
| 1,022,383 | A1 | 3/2019 | Goslin | |
| 10,300,372 | B2 * | 5/2019 | Goslin | A63F 13/212 |
| 10,304,251 | B2 * | 5/2019 | Pahud | G06T 19/006 |
| 2007/0126700 | A1 | 6/2007 | Wright | |
| 2007/0252815 | A1 | 11/2007 | Kuo | |
| 2010/0261526 | A1 | 10/2010 | Anderson | |
| 2011/0250962 | A1 * | 10/2011 | Feiner | A63F 13/57 463/31 |
| 2012/0050535 | A1 | 3/2012 | Densham | |
| 2012/0262365 | A1 | 10/2012 | Mallinson | |
| 2012/0327117 | A1 * | 12/2012 | Weller | G06T 19/006 345/633 |
| 2013/0042296 | A1 | 2/2013 | Hastings | |

(Continued)

OTHER PUBLICATIONS

Virtual and Augmented Reality, Oct. 2016, Citi GPS: Global Perspectives & Solutions.*

(Continued)

*Primary Examiner* — Javid A Amini
(74) *Attorney, Agent, or Firm* — Esplin & Assocaites, PC

(57) ABSTRACT

This disclosure relates to augmenting a physical object with overlay images. An overlay image may be selected to augment the appearance of the physical object. The overlay image may be selected from a repository based on the movement of the physical object. The overlay image may be selected based on whether the physical object is projected. Responsive to determining that the physical object is projected, a first overlay image is selected. The selected first overlay image may be presented over views of the physical object. Responsive to determining the physical object is being held by a user, a second overlay image is selected. The selected second overlay image may be presented over views of the physical object. The appearance of the physical object in a client computing device may be augmented by the selected overlay image.

20 Claims, 8 Drawing Sheets

(56) References Cited

U.S. PATENT DOCUMENTS

| | | | |
|---|---|---|---|
| 2013/0044128 A1* | 2/2013 | Liu | G09G 5/00 |
| | | | 345/633 |
| 2013/0229396 A1* | 9/2013 | Huebner | H04N 9/3147 |
| | | | 345/207 |
| 2013/0286004 A1* | 10/2013 | McCulloch | G06T 19/006 |
| | | | 345/419 |
| 2014/0002329 A1 | 1/2014 | Nishimaki | |
| 2014/0003651 A1* | 1/2014 | Smoot | G06K 9/00335 |
| | | | 382/103 |
| 2014/0078517 A1* | 3/2014 | Ben-Yishai | A61B 8/4254 |
| | | | 356/614 |
| 2014/0080109 A1 | 3/2014 | Haseltine | |
| 2014/0104169 A1 | 4/2014 | Masselli | |
| 2014/0160117 A1 | 6/2014 | Nehmadi | |
| 2015/0201188 A1* | 7/2015 | Pritch | H04N 13/305 |
| | | | 348/189 |
| 2015/0215611 A1* | 7/2015 | Wu | G02B 27/0172 |
| | | | 345/419 |
| 2015/0243286 A1 | 8/2015 | Goslin | |
| 2015/0248785 A1* | 9/2015 | Holmquist | G06T 19/006 |
| | | | 345/419 |
| 2015/0356774 A1* | 12/2015 | Gal | G06F 17/50 |
| | | | 345/633 |
| 2016/0189411 A1 | 6/2016 | Matsunaga | |
| 2016/0206957 A1 | 7/2016 | Goslin | |
| 2016/0247324 A1 | 8/2016 | Mullins | |
| 2016/0253842 A1 | 9/2016 | Shapira | |
| 2016/0260261 A1* | 9/2016 | Hsu | G06T 19/006 |
| 2016/0274662 A1 | 9/2016 | Rimon | |
| 2016/0299563 A1* | 10/2016 | Stafford | G02B 27/017 |
| 2016/0327798 A1* | 11/2016 | Xiao | G02B 3/0006 |
| 2017/0087465 A1* | 3/2017 | Lyons | G07F 17/3211 |
| 2017/0124713 A1* | 5/2017 | Jurgenson | G06T 19/006 |
| 2017/0132841 A1* | 5/2017 | Morrison | G06T 19/006 |
| 2017/0161561 A1* | 6/2017 | Marty | G06K 9/00724 |
| 2017/0203225 A1 | 7/2017 | Goslin | |
| 2017/0213387 A1* | 7/2017 | Bean | G06T 3/20 |
| 2017/0228936 A1 | 8/2017 | Goslin | |
| 2017/0257594 A1 | 9/2017 | Goslin | |
| 2017/0295229 A1 | 10/2017 | Shams | |
| 2018/0081439 A1* | 3/2018 | Daniels | G06F 1/163 |
| 2018/0173300 A1* | 6/2018 | Schwarz | G06F 3/011 |
| 2018/0190017 A1* | 7/2018 | Mendez | G06T 17/20 |
| 2018/0204362 A1* | 7/2018 | Tinsman | A63F 13/537 |
| 2018/0295324 A1* | 10/2018 | Clark | H04N 5/44504 |
| 2018/0350056 A1* | 12/2018 | Cardenas Bernal | G06F 3/011 |
| 2018/0365893 A1* | 12/2018 | Mullins | G06T 19/003 |
| 2019/0019346 A1* | 1/2019 | Cuthbertson | G06T 19/006 |
| 2019/0243446 A1 | 8/2019 | Panec | |

OTHER PUBLICATIONS

Dictionary.com, Defintion of lightsaber, 2019, Dictionary.com, pp. 1-2 (Year: 2019).

* cited by examiner

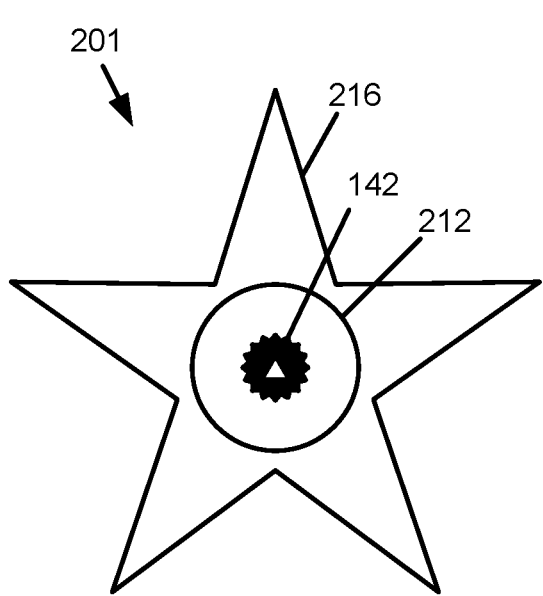
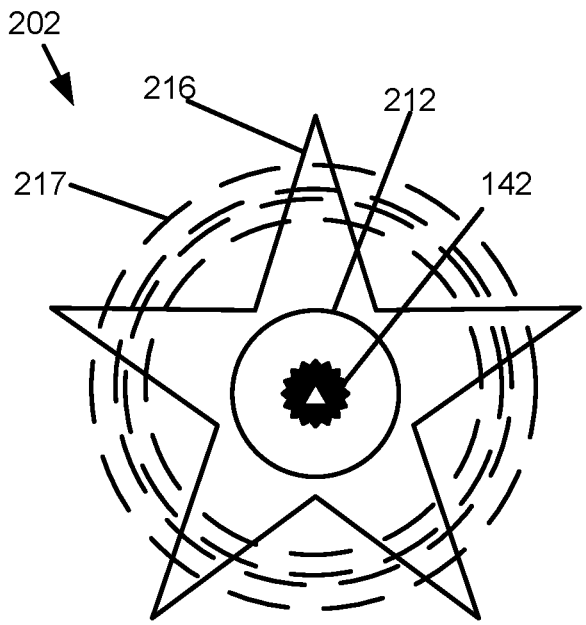
FIG. 4A  FIG. 4B
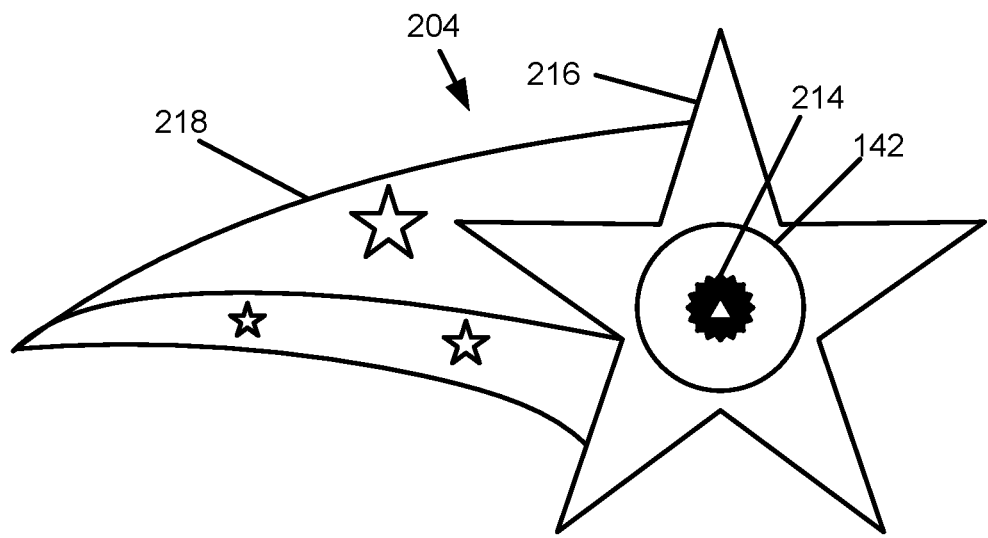
FIG. 4C

SYSTEMS AND METHODS TO AUGMENT AN APPEARANCE OF PHYSICAL OBJECT FOR AN AUGMENTED REALITY EXPERIENCE

FIELD OF THE DISCLOSURE

The present disclosure relates to augmenting an appearance of a physical object in an augmented reality experience.

BACKGROUND

Virtual content may be presented to augment an appearance of an object in an augmented reality experience.

SUMMARY

One aspect of this disclosure relates to augmenting an appearance of a physical object with overlay images. The physical object may be augmented within an augmented reality experience. The augmented reality experience may include views of virtual content (e.g., formed by the overlay images) superimposed over views of a real-world environment. The overlay images may include virtual content, and/or other information. The virtual content may include static and/or dynamic content. Static virtual content may refer to static images. Dynamic content may refer to moving images, including video.

An overlay image selected to augment the appearance of the physical object may be based on a movement of the physical object. For example, the overlay image may be selected based on whether the physical object is projected, held by a user, stationary, and/or in other states. A projection of the physical object may require the physical object to leave contact with the user. The physical object may be projected when it is propelled, discharged, launched, thrown, rolled, tossed, sent in-flight, airborne, dropped, and/or otherwise projected from the user. The physical object may be projected by a user and/or a device operated by the user. Responsive to determining that the physical object is projected, a first overlay image may be selected. The selected first overlay image may be presented over views of the physical object to augment the appearance of the physical object while projected. Responsive to determining the physical object is stationary, not projected, and/or no longer projected, a second overlay image may be selected. The selected second overlay image may be presented over views of the physical object to augment the appearance of the physical object while the physical object is stationary, not projected, and/or no longer projected. The selected overlay image may be presented over views of the physical object in a client computing device such that the appearance of the physical object appears to be augmented by the selected overlay image.

In some implementations, a system configured to augment an appearance of a physical object may include one or more of one or more physical objects, one or more client computing devices, one or more external resources, and/or other components. Users may access the system via the client computing devices. In some implementations, an individual physical object may be configured to communicate with the client computing device(s) according to one or more communication architectures.

In some implementations, the individual physical object may be a device that includes one or more patterned light sources, and/or other components. In some implementations, an individual patterned light source may indicate a reference point for the individual physical object within a real-world environment. The individual patterned light sources may facilitate determination of a location of the individual physical object in the real-world environment. In some implementations, patterns of the patterned light sources of the individual physical objects may be different from one another. In some implementations, the individual physical objects may be identified by their patterned light sources, and/or other information.

In some implementations, an individual client computing device may include one or more of electronic storage, a first sensor set, one or more physical processors, and/or other components. In some implementations, the one or more physical processors may be configured by machine-readable instructions. Executing the machine-readable instructions may cause the physical processors to facilitate augmenting an appearance of individual physical objects. In some implementations, the appearance of the individual physical objects may be augmented in the augmented reality experience. The machine-readable instructions may include one or more computer program components. The one or more computer program components may include one or more of a detection component, a determination component, an overlay component, a presentation component, and/or other components.

In some implementations, the detection component may be configured to detect a presence of an individual physical object in a real-world environment, and/or other information. The detection component may obtain output signals generated by one or more image sensors conveying visual information, and/or other information. The detection component may detect the presence of the individual physical object in the real-world environment based on the output signals conveying the visual information, and/or other information. In some implementations, the detection component may detect a presence of a hand of a user, and/or other objects. The detection component may detect the presence of the hand of the user based on the output signals conveying the visual information, and/or other information. The detection component may detect the presence of the hand of the user based on a depiction of a hand from visual content defined by visual information, and/or other information.

In some implementations, the detection component may determine a location of an individual physical object, and/or other objects. The location of the individual physical object may define the individual physical object's geolocation in the real world, a distance from a reference origin, and/or other information. The reference origin may be a geolocation of a user, a geolocation of an object, and/or other positions. The detection component may determine the location of the individual physical object relative to time, and/or other measurements.

In some implementations, the determination component may be configured to determine whether the individual physical object may be projected within the real-world environment. The individual physical object may be projected when propelled, discharged, launched, thrown, rolled, tossed, sent in-flight, airborne, dropped and/or projected in other ways. The determination component may determine whether the individual physical object is projected based on the output signals conveying the visual information, and/or based on other information. The determination component may determine whether the individual physical object is projected based on the location of the individual physical object relative to time, and/or other information. In some implementations, responsive to the individual physical object not changing location relative to time, the determination component may determine that the individual physical object is stationary, not projected, and/or no longer projected. This may be because being projected may result in changes in location over time. In some implementations, responsive to the individual physical object changing location relative to time (e.g., velocity and/or acceleration) at or above a motion threshold, the determination component may determine that the individual physical object is projected.

In some implementations, the determination component may determine whether a hand of a user is holding the individual physical object. In some implementations, responsive to the hand holding the individual physical object, the determination component may determine that the individual physical object is stationary, not projected, and/or no longer projected (e.g., it may instead currently be held). In some implementations, responsive to the hand not holding the individual physical object, the determination component may determine that the individual physical object is projected (e.g., the individual physical object may have been thrown).

In some implementations, the overlay component may be configured to select an overlay image used to augment the appearance of the individual physical object. In some implementations, the overlay image may be selected from a repository of information defining overlay images stored in a non-transitory storage media, and/or other storage media. The overlay component may be configured to select the overlay image used to augment the individual physical object based on whether the individual physical object is projected within the real-world environment. In some implementations, responsive to the determination component determining that the individual physical object is projected, a first overlay image may be selected to augment the appearance of the physical object. In some implementations, responsive to the determination component determining that the individual physical object is stationary, not projected, and/or no longer projected, a second overlay image may be selected to augment the appearance of the individual physical object.

In some implementations, the presentation component may be configured to facilitate presentation of the augmented reality experience, and/or other content. The presentation component may be configured to effectuate presentation of images forming virtual content via the client computing devices. The presentation component may be configured to effectuate presentation of the images forming the virtual content on a display device of the client computing devices. The presentation component may be configured to effectuate presentation of the overlay image selected by the overlay component on the individual client computing devices. In some implementations, the selected overlay image may be presented on a location on the display device, so that the selected overlay images may be perceived by the user to coincide with the location of the physical object. The presentation component may be configured to position the selected overlay image so that the virtual content portrayed by the selected overlay image may be perceived to augment the appearance of the individual physical object.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 4A illustrates a depiction of a physical object augmented with a first visual overlay, in accordance with one or more implementations.

FIG. 4B illustrates a depiction of a physical object augmented with a second visual overlay, in accordance with one or more implementations.

FIG. 4C illustrates a depiction of a physical object augmented with a third visual overlay, in accordance with one or more implementations.

DETAILED DESCRIPTION

Figure 1:
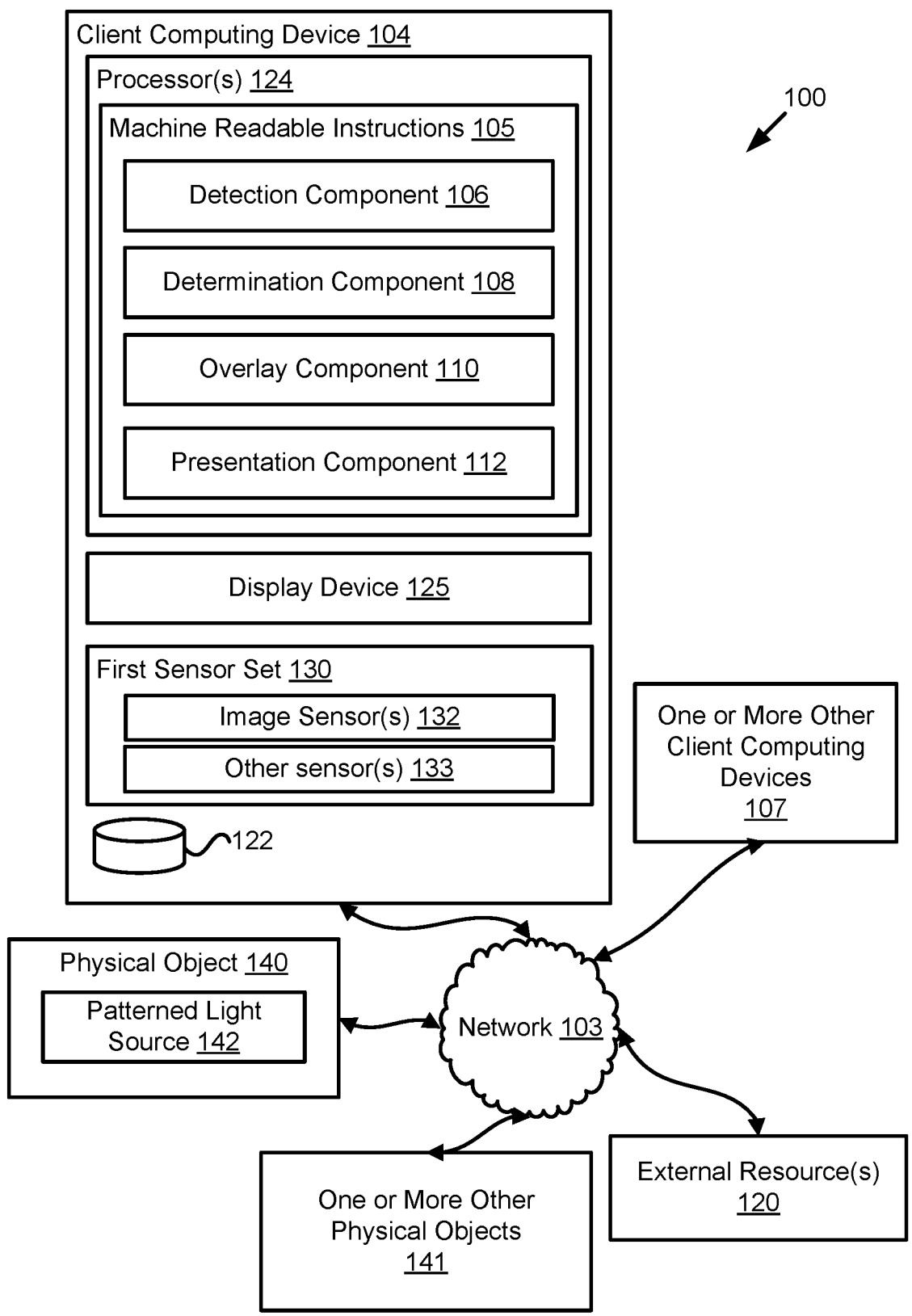
FIG. 1 illustrates a system configured to augment an appearance of a physical object with overlay images in an augmented reality experience, in accordance with one or more implementations.

FIG. 1 illustrates a system 100 configured to augment an appearance of one or more physical objects. System 100 may augment an appearance of one or more physical objects in an augmented reality experience.

In some implementations, the augmented reality experience may include views of virtual content (e.g., formed by overlay images) superimposed over views of a real-world environment. In some implementations, the views of the real-world environment may be seen by the user directly, and the virtual content may be superimposed directly over views of the real-world environment. For example, the views of virtual content may be superimposed over views of the real-world environment by projecting the views of virtual content into the real-world environment. In some implementations, views of the real-world environment may be seen by the user indirectly through a display device. The images forming the virtual content may be superimposed over views of the real-world environment on the display device. For example, the views of virtual content may be superimposed over views of the real-world environment by overlaying the images forming the virtual content on the display device. In some implementations, the augmented reality experience may include one or more of an augmented reality game, an augmented reality video, an augmented reality communication, and/or other augmented reality experiences.

As illustrated in FIG. 1, system 100 may include one or more of the physical object 140, one or more other physical objects 141, client computing device 104, one or more other client computing devices 107, one or more external resources 120, and/or other components. In some implementations, users may access system 100 via client computing device 104 and/or one or more other client computing devices 107. In some implementations, physical object 140 may be configured to communicate with client computing device 104 according to one or more communication architectures.

It is noted that while some descriptions herein may be directed to physical object 140, this is for illustrative purposes only and not to be considered limiting as individual ones of one or more other physical objects 141 may be configured in the same or similar manner as physical object 140. The one or more client computing devices may include one or more of client computing device 104 and/or one or more other client computing devices 107. It is noted that while some descriptions herein may be directed to client computing device 104, this is for illustrative purposes only and not to be considered limiting as individual ones of one or more other client computing devices 107 may be configured in the same or similar manner as client computing device 104.

The appearance of physical object 140 may be augmented with one or more overlay images, and/or other content. Physical object 140 may be augmented with an overlay image such that the overlay image may be perceived to augment the appearance of one or more of physical object 140, an area adjacent to physical object 140, other objects, and/or other areas in space. The overlay image may depict virtual content, and/or other information. In some implementations, the virtual content may include visual content, and/or other content. The visual content may include one or more of static images, video, and/or other content. The overlay images for augmenting the appearance of physical object 140 may be selected based on whether physical object 140 is in motion, and/or other information. In some implementations, physical object 140 may be in motion when it is projected and/or in other states of motion. In some implementations, an overlay image may be selected based on whether physical object 140 is projected, and/or based on other information.

In some implementations, physical object 140 may be a device including one or more patterned light sources 142, and/or other components. In some implementations, physical object 140 and/or one or more other physical objects 141 may include individual physical objects with individual patterned light sources, and/or other components. For example, physical object 140 and one or more other physical objects 141 may include a first physical object with a first patterned light source, a second physical object with a second patterned light source, and/or other physical objects with other patterned light sources, and/or other components.

In some implementations, physical object 140 may include one or more of patterned light source(s) 142, a sensor set, and/or other components. In some implementations, physical object 140 may include one or more of patterned light source(s) 142, a control interface, and/or other components. In some implementations, physical object 140 may include one or more of patterned light source(s) 142, the sensor set, the control interface, and/or other components (depicted in FIG. 2). In some implementations, a sensor set may include one or more sensors. The one or more sensors may include one or more of a gyroscope, an inertial measurement sensor, a global positioning system sensor, a motion sensor, an image sensor, an ultrasonic sensor, an infrared sensor, a light sensor, an inertial sensor, and/or other sensors. In some implementations, the control interface may be configured to receive one or more user inputs from the user (described in more detail herein).

In some implementations, patterned light source(s) 142 may indicate a reference point for physical object 140 within a real-world environment. The patterned light source(s) 142 may facilitate determination of a location of physical object 140 in the real-world environment. In some implementations, patterned light source(s) 142 may facilitate determination of an orientation of physical object 140. Patterned light source(s) 142 may include one or more sources of electromagnetic radiation. In some implementations, patterned light source(s) 142 may include one or more light emitting diodes, and/or other light sources.

In some implementations, patterned light source(s) 142 may be configured to generate light in one or more wavelengths. The generated light may be emitted around physical object 140's surrounding environment. In some implementations, patterned light source(s) 142 may be configured to generate light in one or more frequencies. In some implementations, patterned light source(s) 142 may be configured to generate light in the one or more wavelengths and the one or more frequencies. In some implementations, patterned light source(s) 142 may be configured to generate multiple colors of light. In some implementations, patterned light source(s) 142 may include a static light pattern. The static light pattern may be a light pattern that does not change over time. The static light pattern may be a light pattern that may be fixed. In some implementations, patterned light source(s) 142 may include a dynamic light pattern. The dynamic light pattern may be a light pattern that may change over time.

In some implementations, patterns of the patterned light sources of the individual physical objects may be different from one another. In some implementations, the individual physical objects may be identified by their patterned light sources, and/or other information. In some implementations, the patterned light sources of the individual physical objects may be differently configured so that they can be differentiated. For example, the first patterned light source of the first physical object may emit a different wavelength of electromagnetic radiation compared to the second patterned light source of the second physical object. The first physical object may be identified by the wavelength emitted by the first patterned light source, and/or other information. The second physical object may be identified by the wavelength emitted by the second patterned light source, and/or other information. In some implementations, light sources of the first patterned light source may be configured in a shape that is different compared light sources of the second patterned light source. For example, the light sources of the first patterned light source may be configured in a shape of a circle, and/or other shapes. The light sources of the second patterned light source may be configured in a shape of a square, and/or other shapes. The first physical object may be identified by the shape of the first patterned light source, and/or other information. The second physical object may be identified by the shape of the second patterned light source, and/or other information.

Figure 3A:
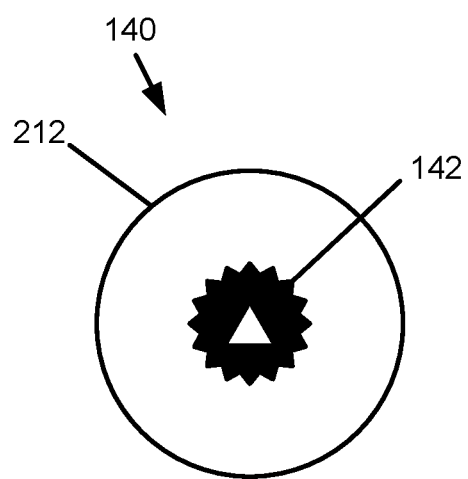
FIG. 3A illustrates depictions of a physical object, in accordance with one or more implementations.
Figure 3B:
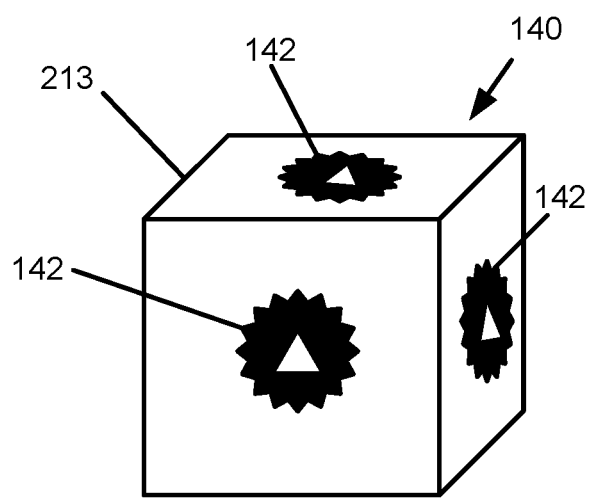
FIG. 3B illustrates depictions of a physical object, in accordance with one or more implementations.

In some implementations, physical object 140 may be a spherical shaped object (as illustrated in FIG. 3A), a cube shape object (as illustrated in FIG. 3B), and/or other shaped objects. In some implementations, physical object 140 may resemble a ball, and/or other objects. In some implementations, physical object 140 may be configured to be held by a user. In some implementations, physical object 140 may be configured to fit on and/or in the hand of the user. In some implementations, physical object 140 may be configured to be propelled, discharged, launched, thrown, rolled, tossed, sent in-flight, airborne, and/or dropped. In some implementations, physical object 140 may be configured to be propelled, discharged, launched, thrown, rolled, tossed, sent in-flight, airborne, and/or dropped by a user.

In some implementations, physical object 140 may include a protective casing and/or protective housing. The protective casing may be configured to protect the components of physical object 140. In some implementations, the protective casing may be configured to protect patterned light source(s) 142, and/or other components of physical object 140. In some implementations, the protective casing may be configured to protect patterned light source(s) 142, the sensor set, and/or other components of physical object 140. In some implementations, the protective casing may form the outer shell of physical object 140. For example, if the physical object 140 was a ball, the protective casing may form the outer structure of the ball. In some implementations, the components of physical object 140 may be positioned at the center of the protective casing, and/or in other positions in the protective casing.

In some implementations, the protective casing may comprise of one or more elastic materials, and/or other materials. The elastic materials may be configured to reduce a force of impact when physical object 140 hits another object and/or surface. The elastic materials may be configured to reduce a force of impact when physical object 140 hits another the object and/or surface so that the components of physical object 140 may not be damaged. For example, the protective casing may be configured to cushion the impact of physical object 140, when physical object 140 is thrown at the object and/or surface. The elastic materials may comprise of one or more plastic, rubber, and/or other materials.

In some implementations, the electromagnetic radiation emitted by patterned light source(s) 142 may be transmitted through the protective casing to a surrounding environment. In some implementations, the protective casing may be configured to allow light to be transmitted from patterned light source(s) 142 to the surrounding environment. In some implementations, the protective casing may be translucent, semitransparent, and/or semi-opaque so that electromagnetic radiation may be transmitted through the protective casing to the surrounding environment.

Figure 2:
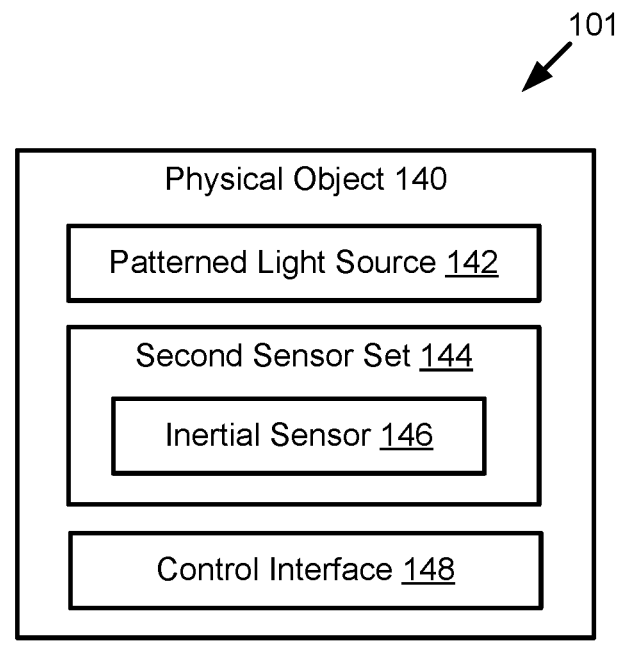
FIG. 2 illustrates a physical object, in accordance with one or more implementations.

Referring to FIG. 2, in some implementations, physical object 140 may be a device that includes patterned light source(s) 142, a second sensor set 144, a control interface 148, and/or other components. In some implementations, sensors of second sensor set 144 may be configured to generate output signals conveying sensor information, and/or other information. In some implementations, physical object 140 may be configured to transmit the output signals generated by sensors of second sensor set 144, and/or other components. In some implementations, physical object 140 may be configured to transmit the output signals generated by the sensors of second sensor set 144 to client computing device 104 and/or other devices. In some implementations, control interface 148 may be configured to generate output signals conveying user input, and/or other information. In some implementations, physical object 140 may be configured to transmit the output signals generated by control interface 148, and/or other components. In some implementations, physical object 140 may be configured to transmit the output signals generated by control interface 148 to client computing device 104 and/or other devices.

In some implementations, control interface 148 may be configured to obtain user inputs from the user, and/or other information. In some implementations, control interface 148 may comprise of one or more switches, buttons, touch sensors, audio sensors, and/or other components for obtaining user inputs from the user. In some implementations, physical object 140 may be configured to transmit the user inputs obtained from the user to client computing device 104 and/or other devices. In some implementations, the user input from the user may comprise of one or more of a voice input received through the audio sensors of physical object 140, one or more of a touch input received through a touch-enabled controllers of physical object 140, one or more of a controller input received through the switches and/or buttons of physical object 140, and/or other user inputs.

In some implementations, the sensors of second sensor set 144 may comprise of one or more inertial sensors 146, and/or other sensors. In some implementations, inertial sensor(s) 146 may comprise of an inertial measurement unit, and/or other components. In some implementations, inertial sensor(s) 146 may be configured to generate output signal conveying movement information. The movement information may define the movement and/or motion of physical object 140. The movement of physical object 140 may include one or more of a direction of movement, a speed, a velocity, an acceleration, a deceleration, elevation, and/or other movements. In some implementations, inertial sensor(s) 146 may comprise of one or more gyroscopes, accelerometers, magnetometers, inertial measurement Unit-enabled GPS devices, and/or other components Referring back to FIG. 1, in some implementations, client computing device 104 may include one or more of an electronic storage 122, a first sensor set 130, one or more physical processors 124, a display device 125, and/or other components. In some implementations, physical processor(s) 124 may be configured by machine-readable instructions 105. Executing machine-readable instructions 105 may cause physical processor(s) 124 to augment the appearance of physical object 140. In some implementations, the appearance of physical object 140 may be augmented within the augmented reality experience. In some implementations, the appearance of physical object 140 may be augmented with overlay images, and/or other virtual content. Machine-readable instructions 105 may include one or more computer program components. The one or more computer program components may include one or more of a detection component 106, a determination component 108, an overlay component 110, a presentation component 112, and/or other components.

In some implementations, display device 125 may be configured to effectuate presentation of images forming virtual content, and/or other content. The display device 125 of client computing device 104 may be translucent, semi-transparent, and/or semi-opaque. In some implementations, display device 125 of client computing device 104 may comprise a display screen, such as a touch-enabled display screen. In some implementations, display device 125 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, the user may see a view of physical object 140 and/or a real-world environment through the display device 125.

In some implementations, a repository of information defining the overlay images may be available via system 100 and/or client computing device 104. The information defining the overlay images may be stored in electronic storage 122, non-transitory storage media, and/or other storage media. The repository of the information defining the overlay images may be a data structure configured to store information defining virtual content. The repository of the information defining the overlay images may comprise a computer-readable medium. In some implementations, a data structure configured to store information defining the overlay images may store executable instructions (e.g., programming code) that may be configured to generate views of the overlay images. The data structure configured to store information defining the overlay images may be a single database or multiple databases. In some implementations, different executable instructions stored in the data structure may perform different functions. The overlay images may depict the virtual content, and/or other content. The virtual content may include one or more virtual entities, virtual objects, and/or other augmented reality content.

In some implementations, first sensor set 130 may include one or more sensors. The one or more sensors may be configured to generate output signals conveying sensor information, and/or other information. In some implementations, first sensor set 130 may include one or more image sensor(s) 132, and/or other sensors 133. In some implementations, other sensor(s) 133 may include one or more of an image sensor, an audio sensor, an infrared sensor, an depth sensor, a gyroscope, an inertial measurement sensor, a global positioning system sensor, a motion sensor, an ultrasonic sensor, a light sensor, an inertial sensor, and/or other sensors.

In some implementations, first sensor set 130 may include at least two image sensors, and/or other sensors. In some implementations, image sensor(s) 132 may include a first image sensor, a second image sensor, and/or other image sensors. The first image sensor and the second image sensor may work as a pair of image sensors. In some implementations, image sensor(s) 132 may be configured to generate output signals conveying visual information, and/or other information. In some implementations, the first sensor set 130 may be removably coupled to client computing device 104, and/or other devices.

In some implementations, an image sensor may be configured to generate output signals conveying visual information, and/or other information. The visual information may define visual content within a field of view of the image sensor and/or other content. The visual content may include depictions of real-world objects and/or surfaces. The visual content may be in the form of one or more of images, videos, and/or other visual information. The field of view of the image sensor may be a function of a position and an orientation of a client computing device. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices.

In some implementations, image sensor(s) 132 may be configured to generate output signals conveying visual information within the field of view of image sensor(s) 132. In some implementations, the visual information within the field of view of image sensor(s) 132 may define visual content, and/or other information. In some implementations, the visual content may depict one or more of physical object 140, patterned light source(s) 142, a user, a hand of the user, and/or other real-world objects and/or surfaces. In some implementations, the visual content may depict the first physical object with the first patterned light source, the second physical object with the second patterned light source, and/or other real-world objects and/or surfaces.

In some implementations, an audio sensor may be configured to generate output signals conveying audio information, and/or other information. The audio information may define audio from a user of the audio sensor (e.g., utterances of the user), audio around the user (such as ambient audio), and/or other information. In some implementations, an audio sensor may include one or more of a microphone, a micro-electro-mechanical microphone, and/or other devices.

In some implementations, a depth sensor may be configured to generate output signals conveying depth information within a field of view of the depth sensor, and/or other information. The depth information may define depths of real-world objects and/or surfaces, and/or other information. A field of view of the depth sensor may be a function of a position and an orientation of a client computing device. In some implementations, the depth information may define a three-dimensional depth map of real-world objects and/or a face of a user. In some implementations, the depth sensor may comprise of one or more ultrasound devices, infrared devices, light detection and ranging (LiDAR) devices, time-of-flight cameras, and/or other depth sensors and/or ranging devices. In some implementations, the infrared devices may include one or more infrared sensors. The infrared sensors may generate output signals conveying the depth information.

In some implementations, detection component 106 may be configured to detect a presence of physical object 140 and/or other objects in a real-world environment. In some implementations, detection component 106 may detect the presence of physical object 140 within the field of view of image sensor(s) 132, and/or other sensors. Detection component 106 may obtain the output signals generated by image sensor(s) 132, and/or other sensors. Detection component 106 may detect the presence of physical object 140 based on the output signals conveying visual information, and/or other information. The visual information may define visual content depicting physical object 140, light emitted by patterned light source 142 of physical object 140, and/or other real-world objects and/or surfaces within the field of view of image sensor(s) 132, and/or other sensors. In some implementations, detection component 106 may use one or more image processing techniques, machine learning techniques, computer vision techniques, and/or other techniques to detect the presence of physical object 140, and/or other objects. Detection component 106 may apply the one or more image processing techniques, machine learning techniques, computer vision techniques, and/or other techniques based on output signals conveying the visual information to detect the presence of physical object 140, and/or other objects.

In some implementations, the image-processing techniques may include one or more of bundle adjustment, SURF (Speeded-Up Robust Features), ORB (Oriented FAST and rotated BRIEF), computer vision, and/or other techniques. The machine learning techniques may include one or more of a convolution neural network, decision tree learning, supervised learning, minimax algorithm, unsupervised learning, semi-supervised learning, reinforcement learning, deep learning, and/or other techniques. The computer vision techniques may include one or more recognition techniques, motion analysis techniques, image restoration techniques, and/or other techniques.

In some implementations, detection component 106 may be configured to detect a presence of patterned light source(s) 142 of physical object 140, and/or other information. In some implementations, detection component 106 may be configured to detect a presence of physical object 140 based on detection of patterned light source(s) 142 of physical object 140, and/or other information. In some implementations, detection component 106 may be configured to detect a presence of physical object 140 based on depictions of patterned light source(s) 142 being defined by the visual information, and/or other information. In some implementations, the output signals conveying the visual information may define the visual content depicting patterned light source(s) 142, and/or other information.

In some implementations, detection component 106 may be configured to detect a presence of physical object 140 based on the output signals conveying the visual information defining the visual content that depicts patterned light source(s) 142. For example, the visual content of patterned light source(s) 142 may indicate the presence of physical object 140. In some implementations, detection component 106 may apply the one or more image processing techniques, machine learning techniques, computer vision techniques, and/or other techniques to detect a presence of patterned light source(s) 142. In some implementations, detection component 106 may apply the one or more image processing techniques, machine learning techniques, computer vision techniques, and/or other techniques based on output signals conveying the visual information to detect the presence of patterned light source(s) 142.

In some implementations, detection component 106 may be configured to detect a presence of the individual physical objects, and/or other objects. For example, detection component 106 may be configured to detect a presence of the first physical object, the second physical object, and/or other physical objects. Detection component 106 may be configured to detect a presence of the individual physical objects contemporaneously in time. Detection component 106 may be configured to detect a presence of the individual physical objects one at a time.

In some implementations, detection component 106 may be configured to detect a presence of the patterned light source of the individual physical objects, and/or other objects. For example, detection component 106 may be configured to detect a presence of the first patterned light source, the second patterned light source, and/or other patterned light sources. Detection component 106 may be configured to detect a presence of the individual patterned light sources contemporaneously in time. Detection component 106 may be configured to detect a presence of the individual patterned light sources one at a time.

In some implementations, detection component 106 may identify individual physical objects based on their patterned light sources. For example, detection component 106 may be configured to detect a presence of the first physical object based on the output signals of the visual information of the first patterned light source, and/or other information. Detection component 106 may be configured to detect a presence of the first physical object based on detection of the first patterned light source of the first physical object, and/or other information. Detection component 106 may be configured to detect a presence of the second physical object based on the output signals of the visual information of the second patterned light source. Detection component 106 may be configured to detect a presence of the second physical object based on detection of the second patterned light source of the second physical object, and/or other information. In some implementations, detection component 106 may identify the individual physical objects from one another by the patterns of the individual patterned light sources. Detection component 106 may be configured to detect a presence of the individual patterned light sources based on their patterned light sources contemporaneously in time. Detection component 106 may be configured to detect a presence of the individual patterned light sources based on their patterned light sources one at a time.

In some implementations, detection component 106 may detect a presence of a user, a hand of the user, and/or other objects. Detection component 106 may detect the presence of the user, the hand of the user, and/or other objects based on the output signals conveying the visual information, and/or other information. Detection component 106 may be configured to detect a presence of the hand based on detection of visual content that is similar to the hand, and/or other information. In some implementations, detection component 106 may use the image processing techniques, machine learning techniques, computer vision techniques, and/or other techniques to detect the presence of the user, the hand of the user, and/or other objects.

In some implementations, detection component 106 may determine the location of physical object 140, other physical objects 141, and/or other objects. In some implementations, the location of physical object 140 may be physical object 140's geolocation in the real world, distance from a reference origin, and/or other information. The reference origin may be an object, a user, and/or other reference origins in the real world. In some implementations, detection component 106 may determine the location of physical object 140 based on the output signals conveying the visual information, and/or other information.

In some implementations, the location of physical object 140 may be specified by a coordinate within one or more coordinate systems. The coordinate systems may include one or more of a Cartesian coordinate system, a polar coordinate system, a geographic coordinate system, and/or other coordinate systems. The coordinate may be defined by a value specifying a position within a coordinate system, and/or other information. In some implementations, a geolocation in the real-world, an object, a reference point, the user, and/or other locations may be an origin of the coordinate system. In some implementations, physical object 140 may be an origin of the coordinate system.

In some implementations, the distance of physical object 140 from the reference origin may be specified by a range between physical object 140 and the reference origin. The range between physical object 140 and the reference origin may be defined by a value, and/or other information.

In some implementations, detection component 106 may determine the location of patterned light source(s) 142, and/or other information. In some implementations, detection component 106 may determine the location of physical object 140 from the location of the patterned light source(s) 142, and/or other information. In some implementations, the location of the patterned light source(s) 142 may indicate the location of physical object 140, and/or other information. In some implementations, the location of the patterned light source(s) 142 may be the same location as physical object 140.

In some implementations, detection component 106 may determine the location of the individual physical objects, and/or objects. For example, detection component 106 may determine a location of the first physical object, a location of the second physical object, and/or other locations of other physical objects. In some implementations, detection component 106 may determine the location of the first physical object, the location of the second physical object, and/or other locations of other physical objects contemporaneously in time. In some implementations, detection component 106 may determine the location of the first physical object, the location of the second physical object, and/or other locations of other physical objects one at a time.

In some implementations, detection component 106 may determine the location of physical object 140 by triangulating the location of physical object 140. In some implementations, detection component 106 may triangulate the location of physical object 140 based on the output signals conveying the visual information, and/or other information. In some implementations, detection component 106 may determine the location of physical object 140, including the location of other physical objects 141, by triangulating the location of physical object 140 based on the output signals conveying the visual information, and/or other information. For example, based on output signals conveying visual information obtained from the first image sensor, the second image sensor, and/or other image sensors, detection component 106 may be configured to determine the location of physical object 140. Detection component 106 may be configured to determine the location of physical object 140 by triangulating the location of physical object 140 from the output signals conveying visual information obtained from the first image sensor, the second image sensor, and/or other image sensors. In some implementations, detection component 106 may determine the location of physical object 140 using the image processing techniques, machine learning techniques, computer vision techniques, and/or other techniques.

In some implementations, detection component 106 may determine the location of physical object 140 relative to time, and/or other measurements. In some implementations, detection component 106 may determine the location of physical object 140, including the location of the individual physical objects, relative to time, and/or relative to other measurements. For example, detection component 106 may determine the location of the physical object 140 at different points in time. Detection component 106 may determine a first location of physical object 140 at a first point in time, a second location of physical object 140 at a second point in time, and/or other locations of physical object 140 at other points in time.

In some implementations, detection component 106 may determine an orientation of physical object 140, and/or other information. In some implementations, detection component 106 may determine the orientation of patterned light source(s) 142, and/or other information. In some implementations, detection component 106 may determine the orientation of physical object 140 from the orientation of the patterned light source(s) 142, and/or other information. In some implementations, the orientation of the patterned light source(s) 142 may indicate the orientation of physical object 140, and/or other information. For example, the direction of the transmitted light of patterned light source(s) 142 may indicate the heading of physical object 140. In some implementations, the orientation of the patterned light source(s) 142 may be the same orientation as physical object 140.

In some implementations, the orientation of physical object 140 may be the physical object 140's heading with respect to a geolocation in the real-world, reference point, an object, a reference point, and/or other locations. In some implementations, the orientation of physical object 140 may be a heading within the coordinate systems. For example, the orientation of physical object 140 may be a heading with respect to a cardinal direction, the Sun, and/or other reference points. In some implementations, detection component 106 may determine the orientation of physical object 140 using the image processing techniques, machine learning techniques, computer vision techniques, and/or other techniques. In some implementations, detection component 106 may determine the orientation of physical object 140 based on the output signals conveying the visual information, and/or other information.

In some implementations, detection component 106 may be configured to obtain output signal conveying orientation information from physical object 140, and/or other devices. In some implementations, detection component 106 may be configured to obtain output signal conveying orientation information generated by the inertial sensors and/or other sensors of physical object 140. In some implementations, the orientation information may define an orientation of physical object 140. In some implementations, the orientation information may define an orientation value specifying the orientation of physical object 140. In some implementations, detection component 106 may determine the orientation of physical object 140 based on the output signals conveying the visual information, and/or other information.

In some implementations, detection component 106 may determine an orientation of physical object 140 relative to time, and/or other measurements. For example, detection component 106 may determine the orientation of the physical object 140 at different points in time. Detection component 106 may determine a first orientation of physical object 140 at the first point in time, a second orientation of physical object 140 at the second point in time, and/or other orientation of physical object 140 at other points in time.

In some implementations, determination component 108 may be configured to determine whether physical object 140 is in motion, and/or other information. Physical object 140 may be in motion when propelled, discharged, launched, thrown, rolled, tossed, sent in-flight, airborne, and/or dropped. Physical object 140 may be in motion when it is projected. Physical object 140 may be projected when propelled, discharged, launched, thrown, rolled, tossed, sent in-flight, airborne, dropped and/or projected in other ways. Physical object 140 may be projected when propelled, discharged, launched, thrown, rolled, tossed, sent in-flight, airborne, dropped and/or projected in other ways by the user.

In some implementations, determination component 108 may be configured to determine whether physical object 140 is in motion based on the output signals conveying the visual information from image sensor(s) 132, and/or other information. In some implementations, determination component 108 may be configured to determine whether physical object 140 is in motion based on the location of physical object 140 relative to time, and/or other information. In some implementations, determination component 108 may be configured to determine whether physical object 140 is in motion based on the location of patterned light source(s) 142 relative to time, and/or other information.

In some implementations, physical object 140 may be in motion when it experiences a velocity, an acceleration, a deceleration, and/or other motions. Determination component 108 may determine whether physical object 140 experienced the velocity, the acceleration, the deceleration, and/or other motions. In some implementations, physical object 140 may be in motion when the velocity, acceleration, deceleration, and/or other motions experienced by physical object 140 exceeds a motion threshold value. The motion threshold value may define a minimum velocity, acceleration, deceleration, and/or other motions required for physical object 140 to be in motion. The motion threshold value may define a minimum velocity value, acceleration value, deceleration value, and/or other values defining the motions required for physical object 140 to be in motion. The motion threshold value may be predetermined. In some implementations, the user may determine the motion threshold value. In some implementations, the user may change the motion threshold value.

In some implementations, determination component 108 may determine whether physical object 140 is projected based on the location of physical object 140 relative to time, and/or other information. In some implementations, responsive to physical object 140 not changing location relative to time, determination component 108 may determine that physical object 140 is stationary, not projected, and/or no longer projected. In some implementations, responsive to physical object 140 changing location relative to time, determination component 108 may determine that physical object 140 is projected.

In some implementations, determination component 108 may be configured to determine the velocity experienced by physical object 140, and/or other information. In some implementations, determination component 108 may be configured to determine the velocity experienced by physical object 140 based on the output signals conveying the visual information from image sensor(s) 132, and/or other information. In some implementations, determination component 108 may be configured to determine the velocity experienced by physical object 140 based on the location of physical object 140 relative to time, and/or other information. For example, based on physical object 140's change in location over time, determination component 108 may calculate a velocity value for the velocity experienced by physical object 140.

In some implementations, determination component 108 may determine the velocity experienced by physical object 140 relative to time, and/or other information. Determination component 108 may determine the velocity experienced by physical object 140 over one or more durations of time. For example, determination component 108 may calculate the velocity value for the velocity experienced by physical object 140 over the one or more durations of time. The velocity value may define the velocity of physical object 140 in a vertical direction, a horizontal direction, and/or a combination of the vertical and horizontal direction.

In some implementations, determination component 108 may determine the acceleration and/or deceleration experienced by physical object 140, and/or other information. In some implementations, determination component 108 may be configured to determine the acceleration and/or deceleration being experience by physical object 140 based on the output signals conveying the visual information from image sensor(s) 132, and/or other information. In some implementations, determination component 108 may be configured to determine the acceleration and/or deceleration being experience by physical object 140 based on the location of physical object 140 relative to time, and/or other information. In some implementations, determination component 108 may be configured to determine the acceleration and/or deceleration being experience by physical object 140 based on physical object 140's change in velocity over time. For example, determination component 108 may be configured to calculate an acceleration value and/or deceleration value for the acceleration and/or deceleration experienced by physical object 140 based on physical object 140's change in velocity over time, and/or other information. The acceleration value and/or deceleration value may define the acceleration and/or deceleration of physical object 140 in a vertical direction, a horizontal direction, and/or a combination of the vertical and horizontal direction.

In some implementations, determination component 108 may be configured to determine the velocity, acceleration, and/or deceleration experienced by physical object 140 based on the sensor information from physical object 140. In some implementations, determination component 108 may be configured to obtain the output signals conveying the sensor information from physical object 140. In some implementations, determination component 108 may be configured to obtain the output signals generated by the inertial sensors, and/or other sensors conveying movement information. In some implementations, determination component 108 may be configured to obtain the output signals generated by the inertial sensors 146, and/or other sensors conveying movement information. The movement information defines the velocity, acceleration, and/or deceleration experienced by physical object 140. The movement information defines the velocity value, acceleration value, and/or deceleration value of the velocity, acceleration, and/or deceleration experienced by physical object 140.

In some implementations, determination component 108 may be configured to determine whether physical object 140 may be in motion based on a comparison between the velocity value, acceleration value, and/or deceleration value, and the motion threshold value. Responsive to the velocity value, acceleration value and/or deceleration value being equal to or exceeding the motion threshold value, determination component 108 may be configured to determine that physical object 140 may be in motion. Responsive to the velocity value, acceleration value and/or deceleration value being below the motion threshold value, determination component 108 may be configured to determine that physical object 140 may not be in motion.

In some implementations, determination component 108 may be configured to determine whether physical object 140 may be projected based on a comparison between the velocity value, acceleration value, and/or deceleration value and the motion threshold value. In some implementations, responsive to the velocity value, acceleration value and/or deceleration value being equal to or exceeding the motion threshold value, determination component 108 may be configured to determine that physical object 140 may be projected. For example, if the motion threshold value is equal to a value for acceleration of gravity and the acceleration value is equal to or exceeding the motion threshold value, determination component 108 may be configured to determine that physical object 140 may be projected. In some implementations, responsive to the velocity value, acceleration value and/or deceleration value being below the motion threshold value, determination component 108 may be configured to determine that physical object 140 may be stationary, not projected, and/or no longer projected. For example, if the motion threshold value is equal to the acceleration of gravity and the acceleration value is below the motion threshold value, determination component 108 may be configured to determine that physical object 140 may be stationary, not projected, and/or no longer projected.

In some implementations, determination component 108 may be configured to determine whether physical object 140 is projected based on whether physical object 140 is held by a user. Physical object 140 may be held by the user when physical object 140 is grasped by a hand of the user, resting on the hand of the user, and/or removably coupled to the hand of the user. Responsive to physical object 140 being held by the hand of the user, determination component 108 may be configured to determine that physical object 140 may be stationary, not projected, and/or no longer projected. Responsive to physical object 140 not being held by the hand of the user, determination component 108 may be configured to determine that physical object 140 may be projected (e.g., physical object 140 may have been thrown).

In some implementations, determination component 108 may be configured to determine whether physical object 140 is held by the user, and/or other information. In some implementations, determination component 108 may be configured to determine whether physical object 140 is held by the user based on the output signals conveying the visual information, and/or other information. In some implementations, determination component 108 may be configured to determine whether physical object 140 may be held by the user based on the location of the physical object 140 with respect to the hand of the user. For example, if physical object 140 is located near or on the hand of the user, determination component 108 may be configured to determine that the physical object 140 may be held by the user. If the object(s) 140 is located away from the hand of the user, determination component 108 may determine that the physical object 140 may not be held by the user.

In some implementations, determination component 108 may be configured to determine whether the individual physical objects are in motion, and/or other information. Determination component 108 may be configured to determine whether the individual physical objects are in motion contemporaneously in time. Determination component 108 may be configured to determine whether the individual physical objects are in motion one at a time.

In some implementations, determination component 108 may be configured to determine whether the individual physical objects are projected, and/or other information. Determination component 108 may be configured to determine whether the individual physical objects are projected contemporaneously in time. Determination component 108 may be configured to determine whether the individual physical objects are projected one at a time.

In some implementations, determination component 108 may be configured to determine whether the user is holding the individual physical objects, and/or other information. Determination component 108 may be configured to determine whether the individual physical objects are held by the user contemporaneously in time. Determination component 108 may be configured to determine whether the individual physical objects are held by the user one at a time.

In some implementations, overlay component 110 may be configured to select the overlay image, and/or other content. In some implementations, overlay component 110 may be configured to select the overlay image for augmenting an appearance of physical object 140, and/or other devices. In some implementations, overlay component 110 may be configured to select the overlay image based on whether physical object 140 is in motion, and/or other information. In some implementations, overlay component 110 may be configured to select the overlay image based on whether determination component 108 determined that physical object 140 is in motion, and/or other information. In some implementations, responsive to physical object 140 being in motion, overlay component 110 may be configured to select a first overlay image, and/or other content. Responsive to physical object 140 not being in motion, overlay component 110 may be configured to select a second overlay image, and/or other content.

In some implementations, overlay component 110 may be configured to select the overlay image based on whether physical object 140 is projected, and/or other information. In some implementations, overlay component 110 may be configured to select the overlay image based on whether determination component 108 determined that physical object 140 may be projected. In some implementations, responsive to physical object 140 being projected, overlay component 110 may be configured to select the first overlay image, and/or other content. Responsive to physical object 140 not being projected, overlay component 110 may be configured to select the second overlay image, and/or other content. The first overlay image, the second overlay image and/or other overlay images may include different virtual content. The different virtual content may include different visual content. For example, the visual content of the first overlay image may appear to be visually different compared to the visual content of the second overlay image.

In some implementations, overlay component 110 may select the overlay image from a repository, and/or other storage media. In some implementations, overlay component 110 may select the overlay image from a repository of information defining the overlay images stored in electronic storage 122, the non-transitory storage media, and/or other storage media. The repository may include the first overlay image, the second overlay image, and/or other overlay images. In some implementations, the overlay image may be selected from a repository of information defining the overlay images stored in external resource(s) 120, and/or other components. External resource(s) 120 may include the first overlay image, the second overlay image, and/or other overlay images.

In some implementations, the visual content of the overlay image may include one or more of an image, a video, and/or other visual content. In some implementations, the visual content of the overlay image may be a static visual content, a dynamic visual content, and/or other visual contents. Static virtual content may refer to static images. Dynamic content may refer to moving images, including video. In some implementations, the static visual content may stay constant over time. In other words, the static visual content may not change in response to events in the augmented reality experience, movement of physical object 140, and/or other occurrences. In some implementations, the dynamic visual content may change in response to time, events in the augmented reality experience, movement of physical object 140, and/or other occurrences.

In some implementations, the static visual content of the overlay image may include a static virtual object, a static virtual entity, and/or other static virtual content. For example, the static virtual object may include a virtual star, a virtual ball, a virtual machine, a virtual weapon, and/or other static virtual objects. The static virtual entity may include a stationary virtual character, a virtual character that does not respond to their environment or the user, and/or other static virtual entities. In some implementations, the static visual content may be configured to augment the appearance of physical object 140, and/or other objects. In some implementations, the static visual content may be configured to augment an area of space with physical object 140. In some implementations, the static visual content may be configured to augment an area of space with physical object 140, including an area of space around physical object 140. In some implementations, the area of space the static visual content augments may be a fixed area. In some implementations, the area of space the static visual content augments may be predetermined.

In some implementations, the dynamic visual content of the overlay image may include a dynamic virtual object, a dynamic virtual entity, and/or other dynamic virtual content. For example, the dynamic virtual object may include a shooting star with a tail that may change in length, a virtual ball that may change in size, a virtual weapon that may change in shape, and/or other dynamic virtual objects. The dynamic virtual entity may include a virtual character that may interact with the user, a virtual character that changes in appearance, a virtual character that reacts to the user and/or a environment, and/or other dynamic virtual entities. In some implementations, the dynamic visual content may be configured to augment the appearance of physical object 140, and/or other objects. In some implementations, the dynamic visual content may be configured to augment an area of space with physical object 140. In some implementations, the dynamic visual content may be configured to augment an area of space with physical object 140, including an area of space around physical object 140. In some implementations, the area of space the dynamic visual content augments may be changed.

In some implementations, the area of space the dynamic visual content augments may be based on the movement of physical object 140, and/or other information. In some implementations, the area of space the dynamic visual content augments may be relative to the speed of the movement of physical object 140, and/or other information. In some implementations, the area of space the dynamic visual content augments may be relative to the velocity experienced by physical object 140, and/or other information. In some implementations, the area of space the dynamic visual content augments may be relative to the acceleration experienced by physical object 140, and/or other information. In some implementations, the area of space the dynamic visual content augments may be relative to the deceleration experienced by physical object 140, and/or other information.

In some implementations, the area of space the dynamic visual content may be configured to augment may be relative to the calculated velocity value, and/or other information. In some implementations, the area of space the dynamic visual content may be configured to augment may be relative to the calculated acceleration value, and/or other information. In some implementations, the area of space the dynamic visual content may be configured to augment may be relative to the calculated deceleration value, and/or other information. For example, the length of the tail of the shooting star may increase in length as the velocity (e.g., the speed of the movement) of physical object 140 increases. The length of the tail of the shooting star may decrease in length as the velocity of physical object 140 decreases.

In some implementations, the area of space the dynamic visual content may be configured to augment may be an area in a direction that is opposite to a direction of travel of physical object 140. In some implementations, the area of space where the dynamic visual content is changing in size may be an area in a direction that is opposite to a direction of travel of physical object 140. For example, the area of space where the dynamic visual content is changing in size may be a trailing end of the physical object 140 while physical object 140 is in motion. In some implementations, the area of space where the dynamic visual content is changing in size may be an area in a direction that is opposite to a direction of travel of physical object 140 while physical object 140 is projected. For example, the area of space where the dynamic visual content is changing in size may be a trailing end of the physical object 140 while physical object 140 is projected. For example, when the shooting star is projected and traveling toward East, the area of space where the dynamic visual content is changing in size may be an area toward West.

In some implementations, responsive to physical object 140 being in motion, overlay component 110 may be configured to select the overlay image with the dynamic visual content, and/or other content. Responsive to physical object 140 not being in motion, overlay component 110 may be configured to select the overlay image with the static visual content, and/or other content. In some implementations, responsive to physical object 140 being projected, overlay component 110 may be configured to select the overlay image with the dynamic visual content, and/or other content. Responsive to physical object 140 not being projected, overlay component 110 may be configured to select the overlay image with the static visual content, and/or other content.

In some implementations, overlay component 110 may be configured to select individual overlay images for augmenting an appearance of the individual physical object, and/or other devices. For example, in response to the first physical object being in motion, overlay component 110 may be configured to select the first overlay image for augmenting an appearance of the first physical object. In response to the first physical object not being in motion, overlay component 110 may be configured to select the second overlay image for augmenting an appearance of the first physical object. In response to the second physical object being in motion, overlay component 110 may be configured to select the first overlay image for augmenting an appearance of the second physical object. In response to the second physical object not being in motion, overlay component 110 may be configured to select the second overlay image for augmenting an appearance of the second physical object. In some implementations, overlay component 110 may be configured to select individual overlay images for augmenting an appearance of the individual physical object contemporaneously in time. In some implementations, overlay component 110 may be configured to select individual overlay images for augmenting an appearance of the individual physical object one at a time.

In some implementations, overlay component 110 may be configured to select the overlay images for augmenting an appearance of physical object 140 based on the speed experienced by physical object 140. In some implementations, in response to physical object 140 experiencing a first speed, a third overlay image or the first overlay image may be selected. In response to physical object 140 experiencing a second speed, a fourth overlay image or the third overlay image may be selected.

In some implementations, overlay component 110 may be configured to select the overlay images for augmenting an appearance of physical object 140 based on the acceleration experienced by physical object 140. In some implementations, in response to physical object 140 experiencing a first acceleration, a fifth overlay image, the third overlay image, or the first overlay image may be selected. In response to physical object 140 experiencing a second acceleration, a sixth overlay image, the fourth overlay image, or the third overlay image may be selected.

In some implementations, overlay component 110 may be configured to obtain the user input from physical object 140, and/or other components. In some implementations, overlay component 110 may be configured to obtain the user input from the control interface of physical object 140, and/or other components. In some implementations, overlay component 110 may be configured to obtain the output signals conveying the user input from the control interface of physical object 140. For example, overlay component 110 may be configured to obtain the user input from control interface 148 of physical object 140, and/or other components. In some implementations, the user input may include a user selection of an overlay image for augmenting an appearance of physical object 140. In some implementations, overlay component 110 may be configured to obtain output signals defining a first user input of a selection of a seventh overlay image, and/or other overlay images. Overlay component 110 may be configured to select the seventh overlay image for augmenting an appearance of physical object 140 based on the first user input. In some implementations, overlay component 110 may be configured to obtain output signals defining a second user input of a selection of an eighth overlay image, and/or other overlay images. Overlay component 110 may be configured to select the eighth overlay image for augmenting an appearance of physical object 140 based on the second user input.

In some implementations, the overlay images available for user selection via the user inputs may be based on whether physical object 140 is projected. For example, if physical object 140 is projected, a first set of overlay images may be made available for selection via the user inputs. If physical object 140 is stationary, not projected, and/or no longer projected, a second set of overlay images may be made available for selection via the user inputs.

In some implementations, presentation component 112 may be configured to facilitate the presentation of the augmented reality experience, and/or other content. Presentation component 112 may be configured to effectuate presentation of images forming virtual content on client computing device 104. Presentation component 112 may be configured to effectuate presentation of the virtual content of the augmented reality experience on client computing device 104. Presentation component 112 may be configured to effectuate presentation of virtual content on display device 125 of client computing device 104. Display device 125 may be configured to facilitate presentation of visual content through client computing device 104.

In some implementations, presentation component 112 may be configured to effectuate presentation of the overlay image selected by overlay component 110, and/or other content. In some implementations, presentation component 112 may be configured effectuate presentation of the selected overlay image, including the virtual content of the selected overlay image, and/or other content. Presentation component 112 may be configured to effectuate presentation of the overlay image selected by overlay component 110 on client computing device 104. In some implementations, display device 125 of client computing device 104 may include a view of physical object 140. Display device 125 of client computing device 104 may include a view of physical object 140 in the real-world environment.

In some implementations, presentation component 112 may be configured to position the selected overlay image on display device 125. The selected overlay image may be positioned on display device 125 such that the selected overlay image may be perceived to augment the appearance of physical object 140 on display device 125. In some implementations, the selected overlay image may be presented on a location on display device 125. In some implementations, the selected overlay image may be presented on a location on display device 125, so that the selected overlay images may be perceived by the user to coincide with the location of physical object 140. In some implementations, the perceived size and/or orientation of the selected overlay image is determined to match the perceived size and/or orientation of physical object 140.

In some implementations, presentation component 112 may be configured to determine a location and/or orientation of the selected overlay image presented on display device 125. The determined location and/or orientation of the selected overlay image may be a location and/or orientation on that display device 125 in which the selected overlay image matches the perceived size and/or orientation of physical object 140. In some implementations, presentation component 112 may be configured to determine the location of the selected overlay image based on the location and/or orientation of physical object 140. In some implementations, presentation component 112 may obtain the location and/or orientation of physical object 140 from detection component 106.

In some implementations, the location of the selected overlay image presented on display device 125 may specify the location on display device 125 in which the selected overlay image may be presented. The location of the selected overlay image presented on display device 125 may specify the area on display device 125 in which the selected overlay image may be presented. The area on display device 125 in which the selected overlay image may be presented may be larger to march the perceived size of physical object 140. The area on display device 125 in which the selected overlay image may be presented may be smaller to march the perceived size of physical object 140. The area on display device 125 in which the selected overlay image may be presented may be based on the perceived distance of physical object 140. The selected overlay image may be presented to match the perceived distance of physical object 140.

In some implementations, the orientation of the selected overlay image presented on display device 125 may specify the orientation of the selected overlay image presented on display device 125. For example, the selected overlay image may be rotated to march the perceived orientation of physical object 140.

For example, consider physical object 140 being relatively further away from client computing device 104. Presentation component 112 may be configured to change the size of the visual content of the selected overlay image on display device 125 of client computing device 104 such that the visual content of the selected overlay image may appear further away from client computing device 104. If physical object 140 is oriented to face a specific direction from client computing device 104, presentation component 112 may be configured to rotate the visual content of the selected overlay image such that the visual content appears to face the specific direction from client computing device 104.

In some implementations, the user may interact with content on display device 125. The user may interact with the content on display device 125 by inputting user inputs through client computing device 104, and/or through other inputs through other devices. The user input may comprise of one or more of a gesture input received through the image sensor and/or other sensors of the given client computing device 104, one or more of a voice input received through the audio sensors of the given client computing device 104, one or more of a touch input received through a touch-enabled display of the given client computing device 104, one or more of a controller input received through game controllers of the given client computing device 104 and/or other user inputs.

Referring to FIGS. 3A-B, the illustration illustrates an example of physical object 140. As illustrated in FIG. 3A, in some implementations, physical object 140 may be in the shape of a sphere, and/or other shapes. In some implementations, physical object 140 may include an outer casing 212 shaped like a sphere, and/or other shapes, the patterned light source 142, and/or other components. As illustrated in FIG. 3B, in some implementations, physical object 140 may be in the shape of a cube, and/or other shapes. In some implementations, physical object 140 may include an outer casing 213 shaped like a cube, and/or other shapes, the patterned light source 142, and/or other components.

Referring to FIGS. 4A-C, the illustration illustrates an example of physical object 140 being augmented with overlay images. As illustrated in FIG. 4A, in some implementations, the appearance of physical object 140 may be augmented with a static virtual content of a star 201. As illustrated in FIG. 4B, in some implementations, the appearance of physical object 140 may be augmented with a dynamic virtual content of a glowing star 202. The glowing stay may comprise of star 201 with a glowing orb 217. In some implementations, glowing orb 217 may change in size relative to the velocity experienced by physical object 140. As illustrated in FIG. 4C, in some implementations, the appearance of physical object 140 may be augmented with a dynamic virtual content of a shooting star 204. In some implementations, shooting star 204 may comprise of star 201 with a tail 218. In some implementations, tail 218 may change in size relative to the velocity experienced by physical object 140. In some implementations, tail 218 may augment an area of space in a direction that is opposite to a direction of travel of the physical object 140 while physical object 140 may be projected.

Figure 5A:
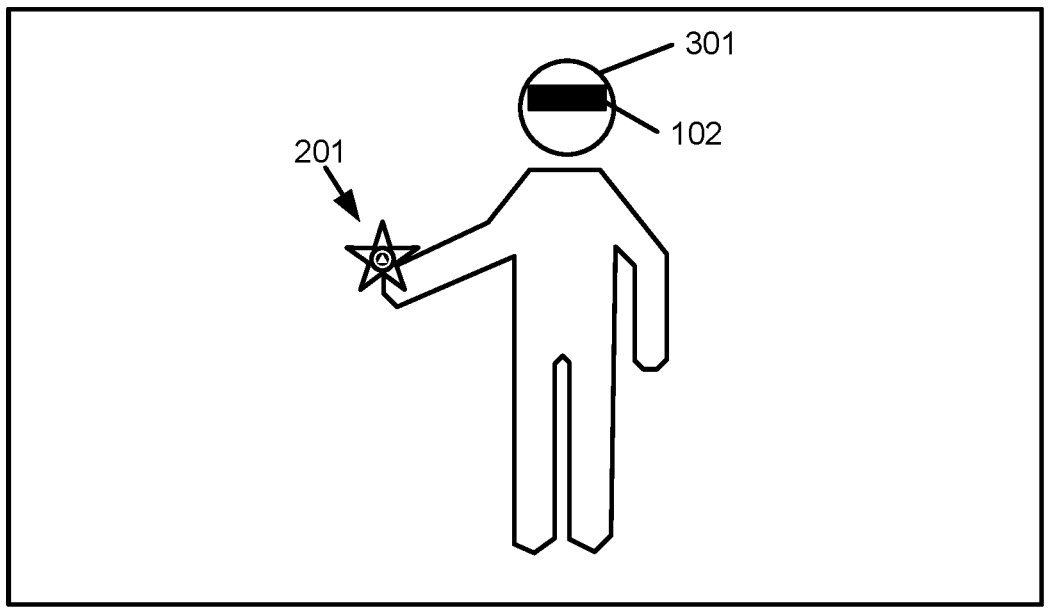
FIG. 5A illustrates a depiction of a user holding a physical object augmented with the first visual overlay, in accordance with one or more implementations.
Figure 5B:
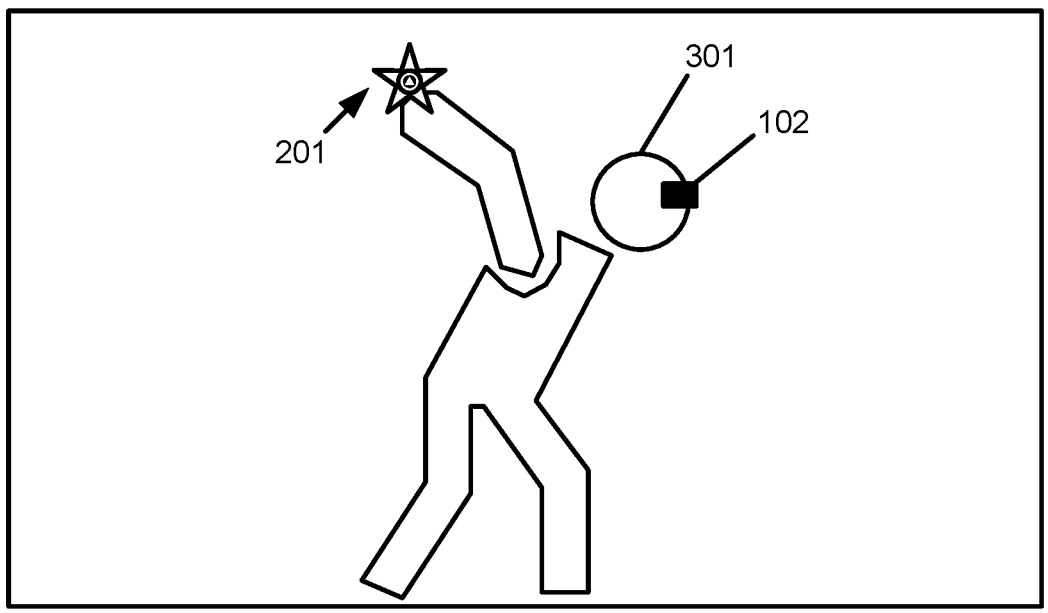
FIG. 5B illustrates a depiction of the user throwing a physical object augmented with the first visual overlay, in accordance with one or more implementations.
Figure 5C:
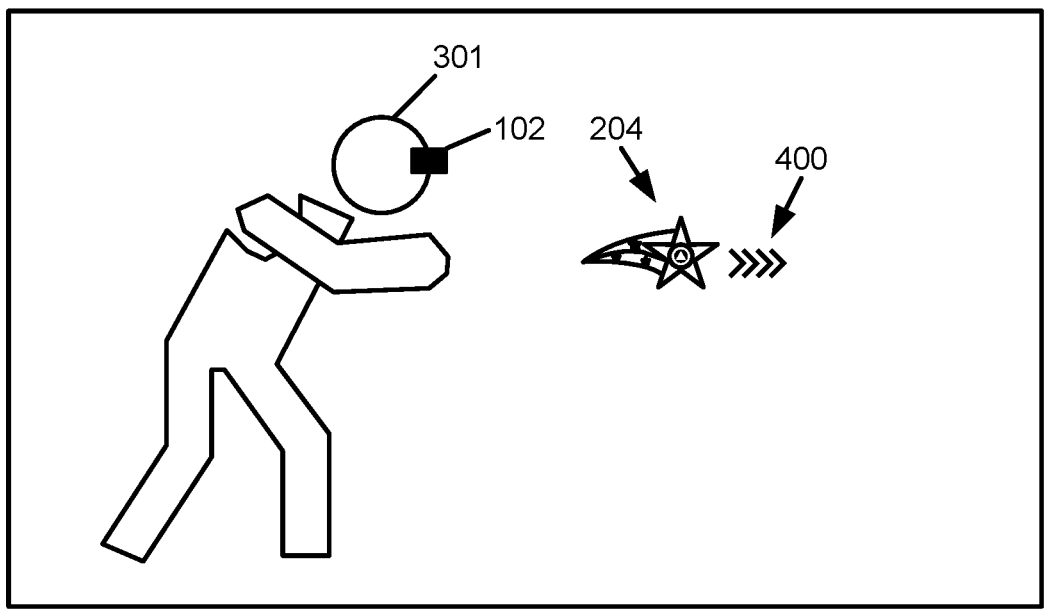
FIG. 5C illustrates a depiction of a physical object augmented with the third visual overlay while projected after being thrown by the user, in accordance with one or more implementations.
Figure 5D:
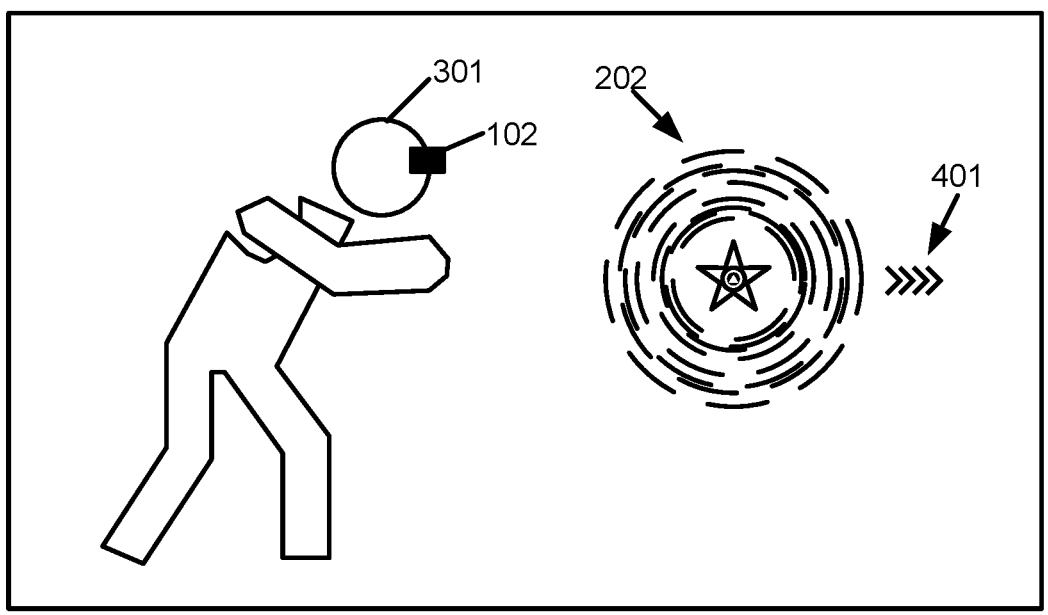
FIG. 5D illustrates a depiction of a physical object augmented with a fourth visual overlay while projected after being thrown by the user, in accordance with one or more implementations.

Referring to FIGS. 5A-D, the illustration illustrates an example of physical object 140 being augmented with the overlay images when physical object 140 is thrown by a user 301. In some implementations, user 301 may be wearing client computing device(s) 104. User 301 may see the appearance of physical object 140 being augmented with overlay images through client computing device(s) 104. As illustrated in FIG. 5A, in some implementations, user 301 may be holding physical object 140. In response to physical object 140 being held, physical object 140 may be augmented to appear like star 201. As illustrated in FIG. 5B, in some implementations, user 301 may throw physical object 140. As illustrated in FIG. 5C in some implementations, physical object 140 may be projected as a result of being thrown. Physical object 140 may be held by user 301 when it is projected. Physical object 140 may experience speed 400 as a result of being thrown. Physical object 140 may be augmented to appear like shooting star 204 as a result of being projected. In some implementations, the length of tail 218 may be relative to speed 400. As illustrated in FIG. 5D, in some implementations, physical object 140 may experience speed 401 after a certain amount of time. In response to physical object 140 experiencing speed 401, physical object 140 may be augmented to appear like glowing orb 217.

Figure 6:
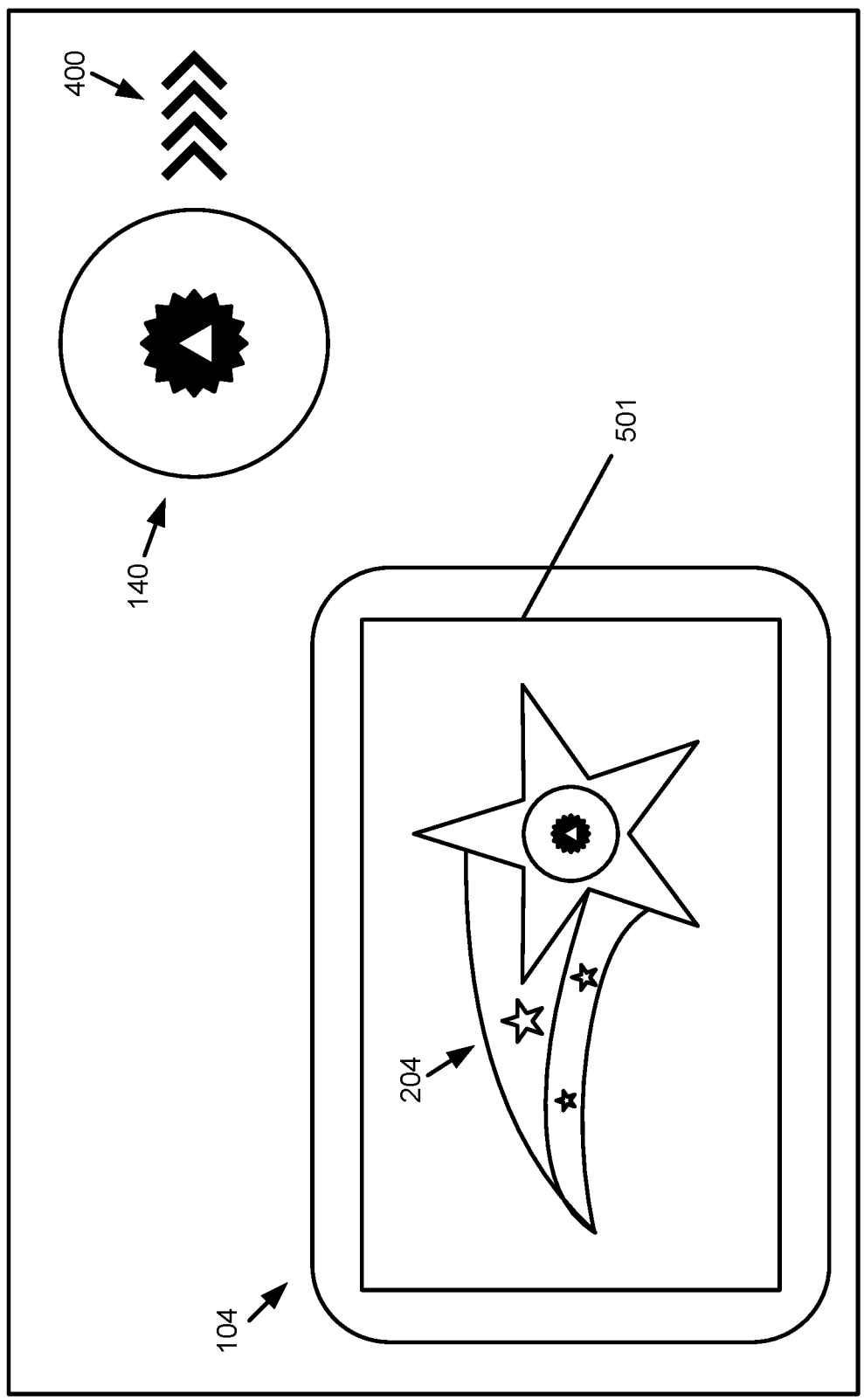
FIG. 6 illustrates a depiction of a physical object in the real-world presented on a client computing device, in accordance with one or more implementations.

Referring to FIG. 6, the illustration illustrates an example of physical object 140 augmented with overlay images presented on a display device 501 on client computing device 104. Physical object 140 may be projected in a real-world environment and experiencing speed 400. The appearance of physical object 140 may be augmented to appear like shooting star 204 on display device 501. The appearance of physical object 140 may be augmented to appear like shooting star 204 on display device 501 based on speed 400 experienced by physical object 140.

Referring back to FIG. 1, in some implementations, physical object 140, client computing device 104, and/or external resources 120 may be operatively linked via one or more electronic communication links. For example, such electronic communication links may be established, at least in part, via the network 103 such as the Internet and/or other networks. It will be appreciated that this is not intended to be limiting and that the scope of this disclosure includes implementations in which physical object 140, client computing device(s) 104, and/or external resources 120 may be operatively linked via some other communication media.

In some implementations, external resources 120 may include sources of information, hosts and/or providers of virtual content outside of system 100, external entities participating with system 100, and/or other resources. In some implementations, some or all of the functionality attributed herein to external resources 120 may be provided by resources included in system 100.

In some implementations, electronic storage 122 may include electronic storage media that electronically stores information. The electronic storage media of electronic storage 122 may include one or both of system storage that is provided integrally (i.e., substantially nonremovable) with client computing device(s) 104 and/or removable storage that is removably connectable client computing device(s) 104 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from client computing device(s) 104, information received from client computing device 104, and/or other information that enables client computing device(s) 104 to function as described herein.

In some implementations, physical processor(s) 124 may be configured to provide information processing capabilities in client computing device(s) 104. As such, physical processor(s) 124 may include one or more of a digital processor, an analog processor, a digital circuit designed to process information, an analog circuit designed to process information, a state machine, and/or other mechanisms for electronically processing information. Although physical processor(s) 124 is shown in FIG. 1 as a single entity, this is for illustrative purposes only. In some implementations, physical processor(s) 124 may include a plurality of processing units. These processing units may be physically located within the same client computing device, or physical processor(s) 124 may represent processing functionality of a plurality of devices operating in coordination. The physical processor(s) 124 may be configured to execute computer-readable instruction components 106, 108, 110, 112, and/or other components. The physical processor(s) 124 may be configured to execute components 106, 108, 110,112, and/or other components by software; hardware; firmware; some combination of software, hardware, and/or firmware; and/or other mechanisms for configuring processing capabilities on physical processor(s) 124.

It should be appreciated that although components 106, 108, 110, and 112 are illustrated in FIG. 1 as being co-located within a single processing unit, in implementations in which physical processor(s) 124 includes multiple processing units, one or more of components 106, 108, 110, and/or 112 may be located remotely from the other components. The description of the functionality provided by the different components 106, 108, 110, and/or 112 described herein is for illustrative purposes, and is not intended to be limiting, as any of components 106, 108, 110, and/or 112 may provide more or less functionality than is described. For example, one or more of components 106, 108, 110, and/or 112 may be eliminated, and some or all of its functionality may be provided by other ones of components 106, 108, 110, and/or 112. As another example, physical processor(s) 124 may be configured to execute one or more additional components that may perform some or all of the functionality attributed herein to one of components 106, 108, 110, and/or 112.

Figure 7:
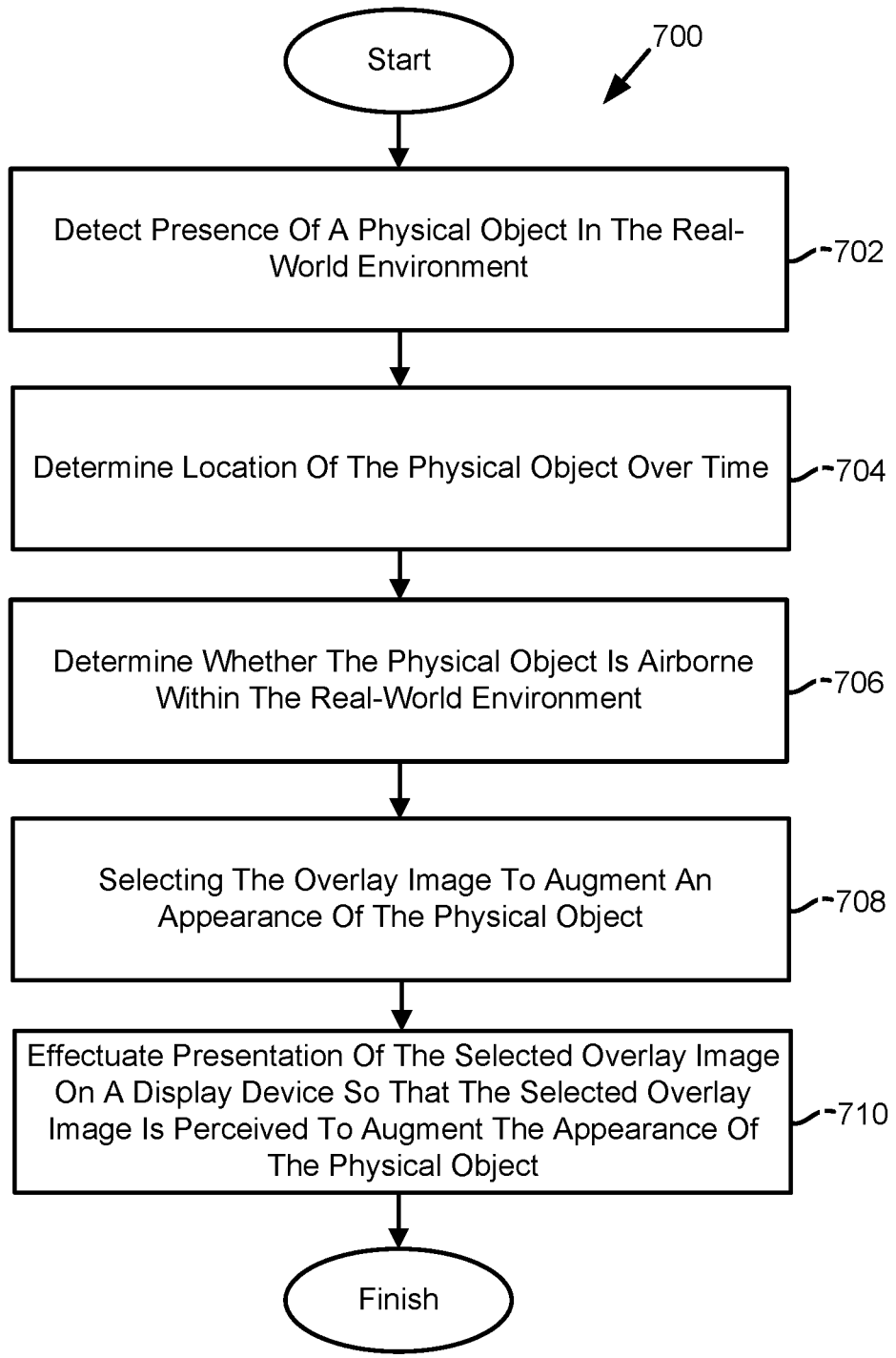
FIG. 7 illustrates a method to augment an appearance of a physical object with overlay images in an augmented reality experience, in accordance with one or more implementations.

FIG. 7 illustrates a method 700 for augmenting a physical object with overlay images. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

In some implementations, the method 700 includes operations for augmenting a physical object with overlay images. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

At an operation 702, presence of a physical object in the real-world environment may be detected. Presence of a physical object in the real-world environment may be detected based on output signals conveying visual information generated by an image sensor. In some embodiments, operation 702 is performed by a detection component the same as or similar to detection component 106 (shown in FIG. 1 and described herein).

At an operation 704, location of the physical object over time may be determined. Location of the physical object over time may be determined based on the output signals conveying the visual information. In some embodiments, operation 704 is performed by a detection component the same as or similar to detection component 106 (shown in FIG. 1 and described herein).

At an operation 706, whether the physical object is projected within the real-world environment may be determined. Whether the physical object is projected within the real-world environment may be determined based on the location. In some embodiments, operation 706 is performed by a determination component the same as or similar to determination component 108 (shown in FIG. 1 and described herein).

At an operation 708, the overlay image to augment an appearance of the physical object may be selected. The overlay image to augment an appearance of the physical object may be selected based on whether the physical object is projected within the real-world environment. Responsive to determining the physical object is projected, a first overlay image is selected to augment the appearance of the physical object. Responsive to determining the physical object is stationary, not projected, and/or no longer projected, a second overlay image is selected to augment the appearance of the physical object. In some embodiments, operation 708 is performed by an overlay component the same as or similar to overlay component 110 (shown in FIG. 1 and described herein).

At an operation 710, presentation of the selected overlay image may be effectuated. The selected overlay image may be presented on a display device so that the selected overlay image is perceived to augment the appearance of the physical object. In some embodiments, operation 710 is performed by a presentation component the same as or similar to presentation component 112 (shown in FIG. 1 and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system configured to augment an appearance of an object, the system comprising:
   a display device configured to effectuate presentation of an overlay image, the overlay image depicting virtual content, the display device being configured such that the overlay image is presented over views of a real-world environment such that the virtual content is perceived as being present in the real-world environment;
   an image sensor configured to generate output signals conveying visual information within a field of view of the image sensor, the visual information defining visual content including depictions of real-world surfaces and/or objects present in the real-world environment within the field of view; and one or more processors configured by machine-readable instructions to:
  detect, based on the output signals conveying the visual information, presence of a physical object in the real-world environment, the physical object comprising a handheld object, the physical object carrying a patterned light source;
  determine, based on the output signals conveying the visual information, location of the physical object over time;
  determine, based on the location, whether the physical object is projected within the real-world environment;
  select, based on whether the physical object is projected within the real-world environment, the overlay image to augment an appearance of the physical object, such that responsive to determining the physical object is projected at a first point in time, a first overlay image is selected to augment the appearance of the physical object at the first point in time, and responsive to determining the physical object is not projected at a second point in time, a second overlay image is selected to augment the appearance of the physical object at the second point in time;
  effectuate presentation of the selected overlay image on the display device so that the selected overlay image is perceived to augment the appearance of the physical object, such that the first overlay image is presented at the first point in time and the second overlay image is presented at the second point in time.

2. The system of claim 1, wherein the one or more processors are further configured by the machine-readable instructions to:
  detect, based on the output signals conveying the visual information, presence of a hand of a user;
  determine, based on the output signals conveying the visual information, whether the physical object is being held by the hand; and
  determine, based on whether the physical object is being held by the hand, whether the physical object is projected within the real-world environment, such that responsive to determining the physical object being held by the hand, determine that the physical object is not projected, and responsive to determining the physical object is not being held by the hand, determine that the physical object is projected.

3. The system of claim 1, wherein the appearance of the physical object is a ball, wherein the ball includes a protective casing, the protective casing being configured to protect the patterned light source and allows light to be transmitted to a surrounding environment.

4. The system of claim 1, wherein the physical object includes a user interface element, the user interface element including one or more of a switch, a button, or a keypad, wherein the user interface element is configured to receive user entry and/or selection to cause a change in the virtual content of the overlay image.

5. The system of claim 1, wherein the one or more processors are further configured by the machine-readable instructions to:
  determine overlay location for the selected overlay image based on the location of the physical object, wherein the overlay location is a location on the display device that causes the virtual content of the selected overlay image to be perceived as augmenting the appearance of the physical object; and
  wherein effectuating presentation of the selected overlay image on the display device is further based on the overlay location.

6. The system of claim 1, wherein the overlay image further appears to augment an area of space adjacent to the physical object.

7. The system of claim 6, wherein the one or more processors are further configured by the machine-readable instructions to:
  determine, based on the output signals conveying the visual information, a speed of movement of the physical object; and
  wherein the first overlay image further appears to augment the area of space adjacent to the physical object, wherein the first overlay image augmenting the appearance of the area of space adjacent to the physical object changes in size relative to the speed of the movement of the physical object.

8. The system of claim 7, wherein the area of space adjacent to the physical object is adjacent to an area in a direction that is opposite to a direction of travel of the physical object while the physical object is projected.

9. The system of claim 1, wherein the physical object further carries an inertial sensor configured to generate output signals conveying movement information, the movement information defining movement of the physical object, the movement referring to one or more of a direction of movement, a speed, a velocity, or an acceleration.

10. The system of claim 9, wherein the one or more processors are further configured by the machine-readable instructions to:
  obtain the output signals conveying the movement information;
  determine, based on the output signals conveying the movement information, the acceleration of the physical object over time; and
  determine, based on the acceleration of the physical object, whether the physical object is projected within the real-world environment.

11. The system of claim 9, wherein the one or more processors are further configured by the machine-readable instructions to:
  obtain the output signals conveying the movement information from the physical object;
  determine, based on the output signals conveying the movement information, the speed of movement of the physical object; and
  effectuate presentation of the first overlay image comprising the first visual effect on the display device, wherein the first overlay image further appears to augment an area of space adjacent to the physical object, wherein the first overlay image augmenting the appearance of the area of space adjacent to the physical object changes in size relative to the speed of movement of the physical object.

12. A method for to augment an appearance of an object, the method comprising:
  detecting, based on output signals conveying visual information generated by an image sensor, presence of a physical object in the real-world environment, the physical object comprising a handheld object, the physical object carrying a patterned light source;
  determining, based on the output signals conveying the visual information, location of the physical object over time;
  determining, based on the location, whether the physical object is projected within the real-world environment;

selecting, based on whether the physical object is projected within the real-world environment, the overlay image to augment an appearance of the physical object, such that responsive to determining the physical object is projected at a first point in time, a first overlay image is selected to augment the appearance of the physical object at the first point in time, and responsive to determining the physical object is not projected at a second point in time, a second overlay image is selected to augment the appearance of the physical object at the second point in time;

effectuating presentation of the selected overlay image on a display device so that the selected overlay image is perceived to augment the appearance of the physical object, including effectuating presentation of the first overlay image at the first point in time and the second overlay image at the second point in time.

13. The method of claim 12, wherein the method further comprises of:
   detecting, based on the output signals conveying the visual information, presence of a hand of a user;
   determining, based on the output signals conveying the visual information, whether the physical object is being held by the hand; and
   determining, based on whether the physical object is being held by the hand, whether the physical object is projected within the real-world environment, such that responsive to determining the physical object being held by the hand, determine that the physical object is not projected, and responsive to determining the physical object is not being held by the hand, determine that the physical object is projected.

14. The method of claim 12, wherein the appearance of the physical object is a ball, wherein the ball includes a protective casing, the protective casing being configured to protect the patterned light source and allows light to be transmitted to a surrounding environment.

15. The method of claim 12, wherein the physical object includes a user interface element, the user interface element including one or more of a switch, a button, or a keypad, wherein the user interface element is configured to receive user entry and/or selection to cause a change in the virtual content of the overlay image.

16. The method of claim 12, wherein the method further comprises of:

determining overlay location for the selected overlay image based on the location of the physical object, wherein the overlay location is a location on the display device that causes the virtual content of the selected overlay image to be perceived as augmenting the appearance of the physical object; and wherein effectuating presentation of the selected overlay image on the display device is further based on the overlay location.

17. The method of claim 12, wherein the overlay image further appears to augment an area of space adjacent to the physical object.

18. The method of claim 17, wherein the method further comprises of:
   determining, based on the output signals conveying the visual information, a speed of movement of the physical object; and
   wherein the first overlay image further appears to augment the area of space adjacent to the physical object, wherein the first overlay image augmenting the appearance of the area of space adjacent to the physical object changes in size relative to the speed of the movement of the physical object.

19. The method of claim 18, wherein the area of space adjacent to the physical object is adjacent to an area in a direction that is opposite to a direction of travel of the physical object while the physical object is projected.

20. The method of claim 12, wherein the physical object further carries an inertial sensor configured to generate output signals conveying movement information, the movement information defining movement of the physical object, the movement referring to one or more of a direction of movement, a speed, a velocity, or an acceleration; and
   wherein the method further comprises of:
      obtaining the output signals conveying the movement information;
      determining, based on the output signals conveying the movement information, the acceleration of the physical object over time; and
      determining, based on the acceleration of the physical object, whether the physical object is projected within the real-world environment.

* * * * *